Figure 1:
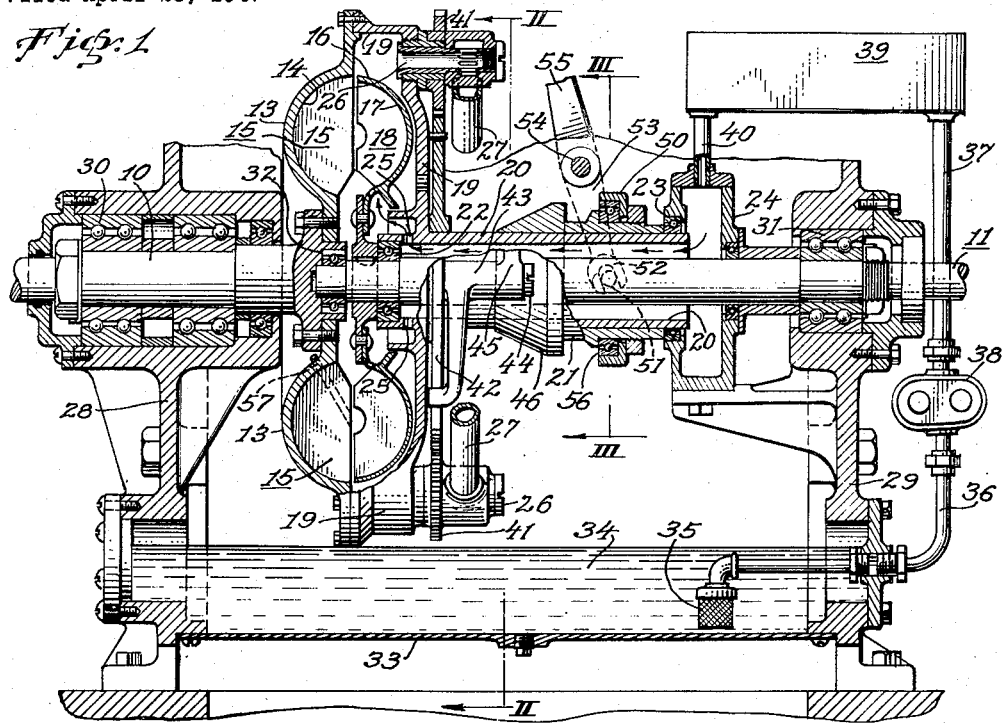

Aug. 25, 1953  C. A. ODING  2,649,690
VARIABLE SPEED ROTARY FLUID COUPLING
Filed April 28, 1947  3 Sheets-Sheet 1

INVENTOR.
CARL A. ODING.
BY
*[signature]*
ATTORNEY.

Aug. 25, 1953   C. A. ODING   2,649,690
VARIABLE SPEED ROTARY FLUID COUPLING

Filed April 28, 1947   3 Sheets-Sheet 2

INVENTOR.
CARL A. ODING.
BY
W. H. Atkinson
ATTORNEY.

Aug. 25, 1953 C. A. ODING 2,649,690
VARIABLE SPEED ROTARY FLUID COUPLING
Filed April 28, 1947 3 Sheets-Sheet 3
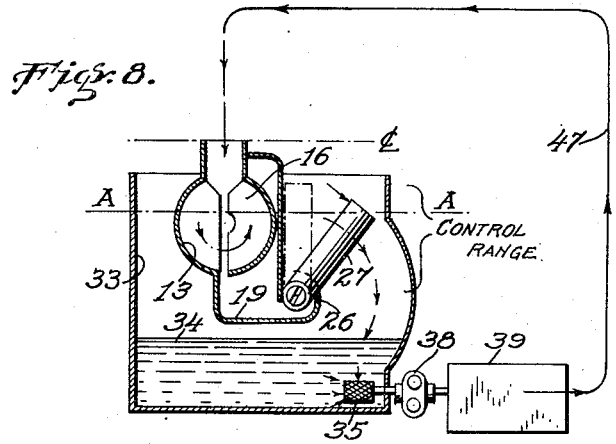
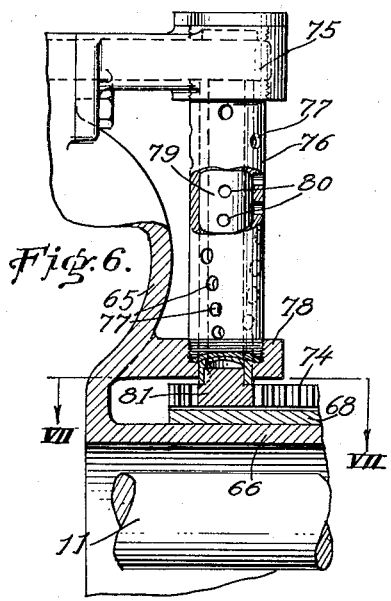
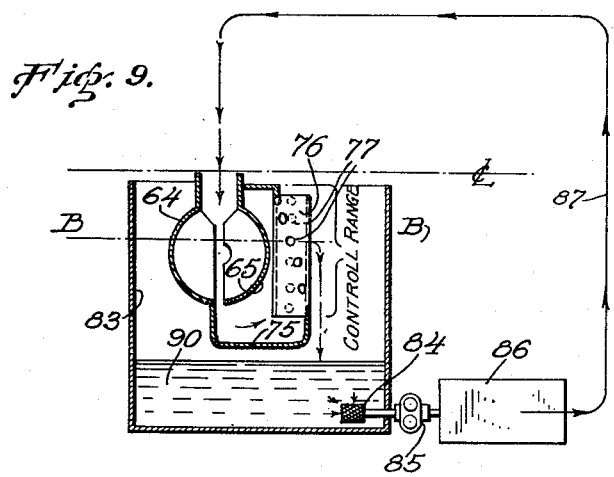
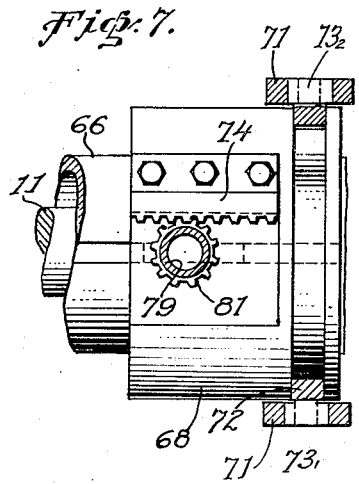
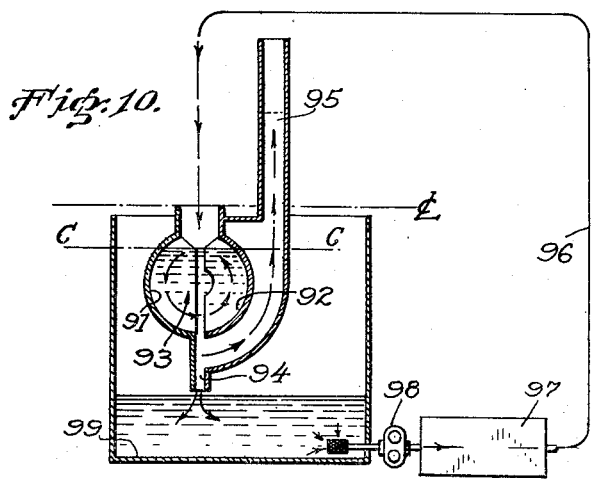
INVENTOR.
CARL A. ODING.
BY
Wm H. Atkinson
ATTORNEY.

Patented Aug. 25, 1953

2,649,690

UNITED STATES PATENT OFFICE 2,649,690

VARIABLE SPEED ROTARY FLUID COUPLING

Carl A. Oding, Alameda, Calif., assignor, by direct and mesne assignments, to Planamatic Corporation, Oakland, Calif., a corporation of California Application April 28, 1947, Serial No. 744,385

4 Claims. (Cl. 60—54)

The present invention relates to hydraulic couplings of the kinetic energy type, in which a driving member and a driven member are so constructed and juxtaposed that an energy transmitting fluid will circulate therebetween in a vortex ring and more particularly to an improved type of fluid coupling or clutch having means by which the quantity of fluid in circulation between its driving and driven members may be varied to control the slip, torque and/or speed transmitting characteristics of the coupling.

It is sometimes desirable in a coupling of this type to selectively control the operating characteristics thereof. This is generally accomplished by varying the amount of liquid in the vortex or working chamber formed between the driving and driven members of the coupling.

At the present time there are several methods by which this result can be obtained. The most common procedure is to permit the escape of oil through a constricted outlet at the perimeter of the vortex chamber and then regulate the flow of a fluid thereto by a variable pumping means which will compensate for this loss of fluid and thus maintain a desired level of fluid in the vortex chamber. In another arrangement where the flow of fluid is maintained at a rate which will more than compensate for any loss of fluid at the perimeter of the vortex ring there is provided a scoop-like discharge outlet which may be regulated to extract fluid from the vortex supporting chamber whenever fluid in an excess of that which is required will be directed out of the vortex chamber. Normally couplings of this type are operated with the vortex chamber completely filled but where a difference in speed between the driving and driven members becomes important as in connecting a load to a source of power and/or for the purpose of maintaining a difference in speed between the driving and driven members, these couplings may be operated with the vortex chamber only partially filled. Under these conditions the amount of operating fluid in the vortex chamber will determine the slip that will prevail between the driving and driven members. In other words, as the operating fluid is withdrawn from the vortex chamber the slip between the driving and driven members will increase. By the same token, as the vortex chamber is filled up the driving and driven members will come into rotation at more nearly the same speeds. In a good coupling under full load conditions and with the vortex chamber completely filled, the normal slip will vary rarely exceed 2%.

The principal object of my present invention is to provide a fluid clutch or coupling of the fluid vortex type which may be operated efficiently for long periods as a speed reducing unit without overheating which is the major fault in like couplings of the prior art.

Another object of the invention is to provide a new and novel arrangement by which any desired or predetermined level of operating fluid may be maintained in the vortex chamber of the coupling independently of the rate of flow of said fluid to and therefrom.

Another object of the invention is to provide a novel form of centrifugally operated fluid discharge means for the vortex chamber of a fluid coupling by which any predetermined level of operating fluid may be maintained in the vortex chamber of the coupling without interfering with the free circulation of the operating fluid therethrough.

Another object of the invention is to provide an improvement in a coupling of the Föttinger type which will permit a manual adjustment of the slip between the vortex chamber forming members of the coupling while in operation and entirely independently of the flow of the working fluid through the coupling.

Another object of the invention is to provide an arrangement for the control of the fluid level in a coupling of the vortex chamber type as herein contemplated, which will permit of a rapid change and/or a continued operation at a reduced output speed without overheating.

A further object of the invention is to provide an improved arrangement wherein all of the objects and advantages hereinabove set forth are obtained in a fluid coupling of the so-called vortex chamber type without the use of a fluid scooping device such as is now employed for maintaining a desired level of operating fluid within the vortex chamber.

The foregoing and other objects of the invention, which will be apparent to those skilled in the art, are attained by means of a novel combination and arrangement of parts to be hereinafter described and claimed, and in order that the same may be better understood, reference is had to the accompanying drawings which illustrated the now preferred forms of the invention. It is to be understood, however, that the inventive conception is capable of many other mechanical expressions within the scope of the subject matter claimed hereinafter.

Figure 2:
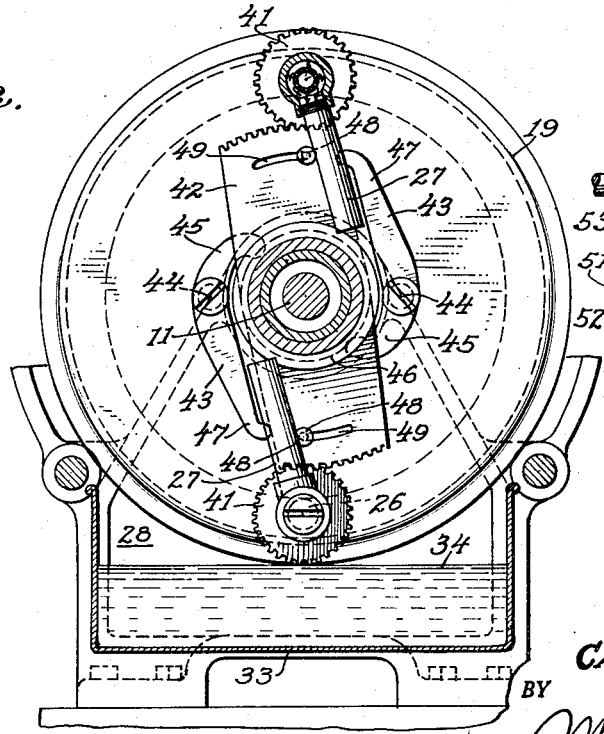
Figure 3:
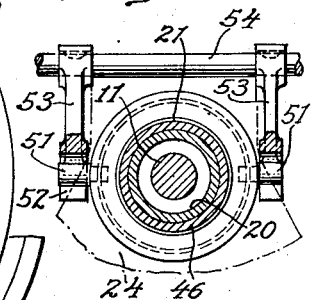
Figure 4:
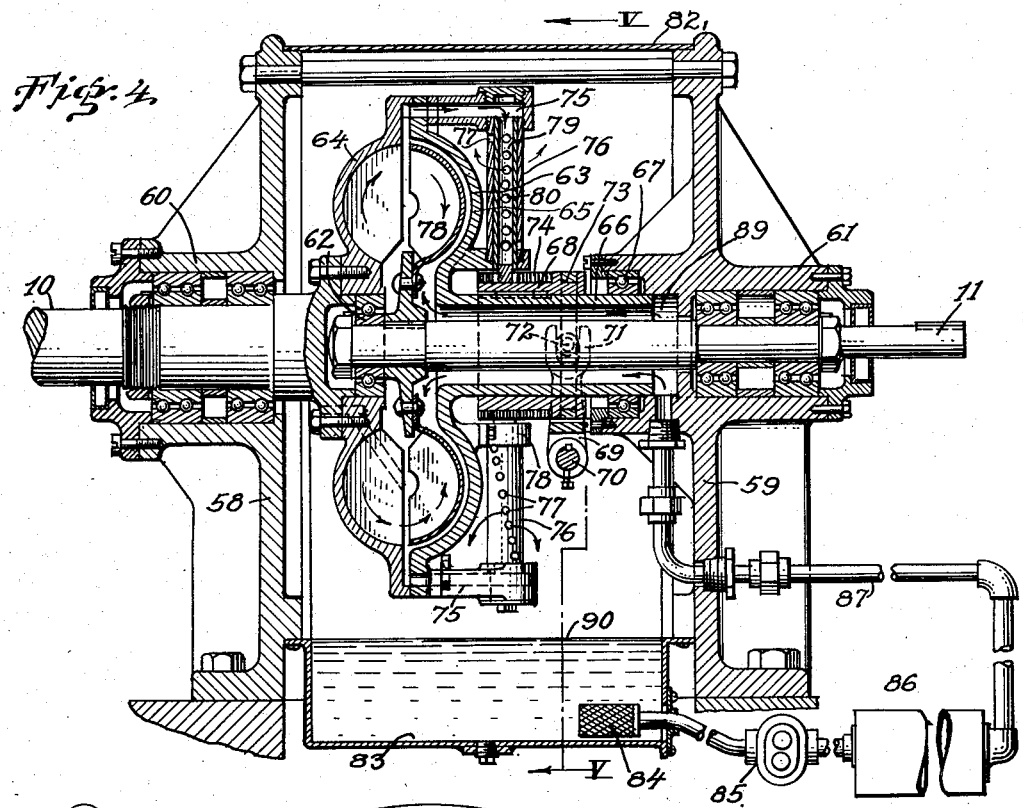
Figure 5:
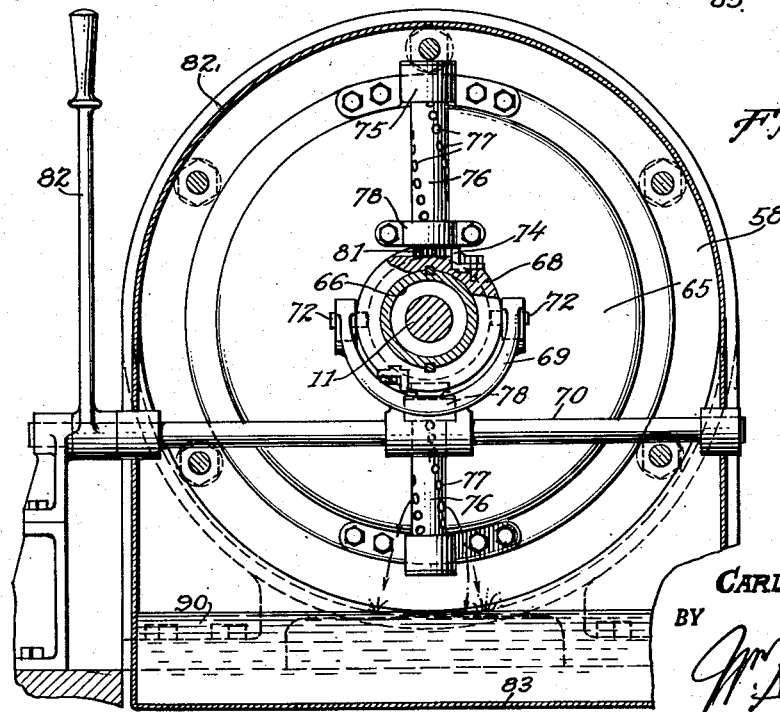

In the drawings:

Figure 1 is a vertical sectional view, with parts broken away and taken longitudinally along the center line of a coupling constructed in accordance with one embodiment of the invention, Figure 2 is a vertical sectional view taken along line II—II of Figure 1, Figure 3 is a fragmentary sectional view showing a detail of construction and taken along line III—III of Figure 1, Figure 4 is a view similar to Figure 1 showing a modified form which the invention may take, Figure 5 is a transverse sectional view taken along line V—V of Figure 4, Figure 6 is a fragmentary view showing details of the valve means illustrated in Figure 4 of the drawings, Figure 7 is a fragmentary sectional view taken along line VII—VII of Figure 6, and Figures 8, 9 and 10 are views diagrammatic chosen to illustrate the principles involved in the operation of my improved coupling.

The major problem in operating a fluid clutch or coupling of the hydraulic type such as is here contemplated under conditions involving excessive slips is to provide a means for preventing an overheating of the operating fluid. With the prior art methods this problem is difficult of solution for the reason that the circulation of fluid through the coupling is limited by the restricted fluid outlet means through which the operating fluid escapes or is withdrawn from the vortex chamber. In accordance with my present invention, this difficulty is overcome by providing for a free discharge of the operating fluid from the vortex chamber in such a manner that the level of fluid in the vortex chamber may be maintained constant at all times irrespective of the rate of flow of the operating fluid into the vortex chamber. Briefly this is accomplished by providing a means that will form an outlet at the perimeter of the vortex chamber which will discharge the fluid inwardly at a point nearer the axis of rotation of the driving and driven members and within the radial limits of the vortex chamber formed between the driving and driven members. This in effect provides what may be termed a centrifugally operating fluid trap in which the trapped fluid will establish a counterbalancing column or volume of fluid externally of the vortex chamber of the coupling which will determine the level or amount of operating fluid that will remain in the vortex chamber and this independently of the rate of flow or quantity of fluid introduced into the vortex chamber from the fluid supply source.

In Figures 1, 2 and 3 of the accompanying drawings I have shown my invention as embodied in a fluid coupling or clutch which is arranged to transmit power from a driving shaft 10 to a driven shaft 11. As here shown, the driving shaft 10 is flanged at its end and it carries a driving member 13 that has an annular vortex chamber forming portion 14 within which there is provided a plurality of spaced and conventionally extending fins or webs 15 that terminate in a vertical plane where in conjunction with a driven member 16 having a similar vortex forming cavity 17 and webs or partitions 18 it will serve to form a chamber within which an operating fluid may circulate when energy is being transmitted from the driving member 13 to the driven member 16. Extending from and in overlapping relation with the driven member 16 there is a chamber forming portion 19 that is carried by the driven member 13. This chamber forming portion 19 extends inwardly about the driven member and toward the axis about which the driving and driven shafts 10 and 11 rotate. At its inner edge this chamber forming portion 19 has a cylindrical collar 20 that will serve as a support for a sliding collar 21, the purpose of which will hereinafter appear. The sleeve portion 20 is held at one end in spaced relation with the driven shaft 11 by means of a bearing 22 and at its other end it is supported by a bearing 23 that is carried by a suitable fluid directing housing 24 which surrounds the shaft 11. With this construction it will be seen that when an oil or other energy transmitting fluid is introduced into the chamber formed by the member 24 it will flow, as indicated by arrows, between the collar 20 and the shaft 11 and through ports 25 into the vortex chamber provided by the juxtaposed driving and driven members 13 and 16 of the coupling. Outwardly beyond the perimeter of the vortex chamber formed by the members 13 and 16 and carried by the chamber forming portion 19 there is a discharge outlet 26 through which the introduced fluid may be discharged under the influence of centrifugal force. In order to provide against a complete emptying of the vortex chamber and at the same time maintaining any predetermined level of fluid therein the conduit 26 is here shown as having a swingable extension 27 which is open at its outer end. With such an arrangement it will be seen that by moving the swingable extension 27 about the axis provided by the conduit 26 it will be possible to locate the open end of the swingable extension 27 in an infinite number of different radial positions with respect to the axis about which the driving and driven members 13 and 16 operate. In practice it is contemplated that the swingable conduit forming extension 27 may be of such a length that its effective range of operation will cover substantially the entire radial depth of the vortex chamber. Therefore, by a proper positioning of the swingable discharge extension 27 it will be possible to maintain any desired level of operating fluid within the vortex chamber irrespective of the rate of flow of the fluid which will be continuously introduced into the vortex chamber, as above stated. The inwardly extending swingable extension 27 as here associated with the discharge outlet 26 of the chamber formed by the portion 19 provides what in effect may be called an inverted fluid trap by which the level of the fluid retained in the vortex chamber is controlled. In other words, there is formed what may be also described as a weir-like discharge outlet over which the fluid centrifugally accumulated in the vortex chamber in excess of a predetermined level may spill or freely flow, as will be determined by position of the open end of the swingable extension 27. In connection with this circulation of the operating fluid it will be noted that the driving and driven shafts are mounted within an enclosing housing which has end portions 28 and 29 in which the driving shaft 10 and the driven shaft 11 are respectively journaled by means of suitable bearings 30 and 31. At its inner end the driven shaft 11 is also shown as supported and held in register with the driving shaft 10 by means of a telescoping bearing 32. In this arrangement the end portions 28 and 29 of the enclosing housing are shown as provided with a cylindrical body forming portion 33 that will serve to collect the operating fluid, here designated by the numeral 34, at the bottom thereof as it is discharged from the coupling. Submerged in the fluid 34 there is also shown a suitable screened intake 35 through which oil may be pumped through pipes 36 and 37 by a pump 38. In this instance the discharge of the pump 38 is directed by the pipe 37 to a suitable heat transfer or cooling unit 39 where the circulating oil will be subjected to a cooling after which it will flow through a pipe 40 to the chamber formed by the member 24 at the outer end of the sleeve 20 which is carried by the driven member 13.

In this particular showing the chamber forming member 19 is illustrated as provided with two of the discharge conduits 26 with their related swingable spout-like discharge extensions 27 disposed in diagrammatically opposite positions thereupon, but in practice it will be understood that where desired or required a greater number of these discharge extensions 26 with their swingable spout-like discharge extensions 27 may be provided. Now with particular reference to Figure 2 of the drawings it will be noted that the swingable spout-like discharge extensions 27 are each keyed to a gear 41 that meshes with a double ended gear sector 42 that is rotatably mounted upon the collar 20 of the chamber forming housing 19. This double ended gear sector 42 operates in a plane transverse to the axis about which the coupling device rotates, and it is adapted to be rocked from one position to another and between certain limits by two similar and oppositely disposed and arranged levers 43 that are pivotally mounted intermediate their ends upon studs 44 which extend outwardly from the inwardly extending wall of the chamber forming member 19. These levers 43 each have a short end 45 which is located so as to engage with a conical surface forming member 46 that is carried by the end of the slidable sleeve 21 and at their other ends these levers 43 have longer arms 47 that are adapted to engage opposite edges of the double ended gear sector 42 so that when the conical surface forming member 46 is moved axially along the collar 20 the levers 43 will be rocked and in cooperating relation with each other they will cause the double ended gear sector to rotate in one direction or the other and through the gears 41 cause the swingable spout-like discharge extensions to swing outwardly or inwardly as indicated by the direction arrows applied to Figure 2 of the drawings. The limits of movement of the double ended gear sector 42 is controlled by pins 48 that extend outwardly from the wall of the chamber forming portion 19 and into arcuate slots 49 which are formed in the gear sector 42.

By referring back to Figure 1 and with particular reference to Figure 3 of the drawings, it will be noted that the slidable sleeve 21 carried by the collar 20 of the chamber forming member 19 is provided with a yoke or trunnion forming ring 50 that carries oppositely extending pins 51 with which the forked ends 52 of the operating lever arms 53 cooperate. These operating lever arms 53, as here shown, are mounted in spaced relation upon a transversely extending shaft 54 that extends through one side of the enclosing housing where it is adapted to be turned by an externally located lever arm 55 which in practice may be operated either manually or by any other suitable means. To this end the yoke or trunnion forming ring 50 is also shown as journaled upon the slidable sleeve 21 by means of a ball race 56. At this point it should be noted that the driving member 13 is also provided with a series of venting passageways 57, only one of which is here shown. These passageways are preferably formed within one of the fins or webs 15 and they function to admit air into the vortex chamber at the center of the vortex where the admission of air will prevent the building up of a vacuum within the vortex chamber when the operating fluid is being discharged therefrom.

In Figures 4 and 5 of the drawings there is shown a further modification of the invention in which the driving shaft 10 and a driven shaft 11 are shown as juxtaposed within an enclosing housing similar to that previously described and which is formed by end plates 58 and 59 that carry suitable shaft supporting bearings 60 and 61. At their meeting ends the shafts 10 and 11 are also held in alignment by means of a suitable telescoping bearing 62. In this particular arrangement the driven shaft 11 carries a secondary or driven member 63 which is somewhat similar to the driven member 16 of the previously described embodiment. A driving member 64 which differs, as will now appear, from the previously described driving member 13 is carried by the driving shaft 10. This driving member 64 like the driving member 16 carries an inwardly extending and overlapping portion 65 that is adapted to surround the driven member 63 and at its inner edge this portion 65 also has a cylindrical collar 66 which is disposed in spaced relation to the driven shaft 11 and there supported by a suitable bearing 67. Mounted upon the cylindrical collar 66 there is also an axially slidable sleeve 68 which is adapted to be moved for a limited distance along the cylindrical collar 66 by means of a yoke-like lever arm 69 which is keyed upon a transversely extending shaft 70. Forked ends 71 of the lever arm 69 are also here shown as engageable with oppositely extending pins 72 that are carried by a freely rotatable ring 73 which is recessed within an annular groove formed upon the outer end of the slidable sleeve 68. The slidable sleeve 68 also carries two axially extending rack gears 74 which, as will hereinafter appear, operate to control the discharge of fluid from the vortex chamber formed by the driving and driven members 64 and 63. In this particular embodiment of the invention the driving member 64 is provided with an axially extending conduit 75 which connects at one end with the space at the perimeter of the vortex chamber. At its other end the conduit 75 is provided with a radially disposed and inwardly extending valve member 76 which is in the form of a spirally perforated conduit with ports 77. This valve member or radially extending conduit 76 with its ports 77 is supported in a fixed position at its outer end by the conduit 75 and at its inner end there is a bracket 78 which extends outwardly from the overlapping portion 65 of the driving member 64 at a point closely adjacent the rack gear 74 carried by the slidable sleeve 68. Disposed within the spirally perforated valve member or conduit 76 and rotatable with respect thereto there is a tubular valve member 79 which carries a plurality of apertures or perforations 80 that are arranged in a straight line and which are adapted to be successively brought into register with the spirally arranged ports 77 of the spirally perforated valve member 76. This tubular valve member 79 is here shown as adapted to be rotated within the spirally perforated conduit 76 by means of a pinion gear 81 which is fixed upon the lower end thereof where it will mesh with the rack gear 74 upon the slidable sleeve 68.

With this particular arrangement of ports and apertures upon the valve member or conduit 76 and the tubular valve member 79 it is contemplated that as the tubular valve member 79 is turned within the conduit 76 the perforations 80 and the ports 77 will come into register progressively in a direction leading from the conduit 76 and toward the axis about which the coupling is operating. As is more clearly shown in Figure 5 of the drawings the yoke-like lever arm 69 is adapted to be moved by a manually operated lever arm 82 that is keyed upon the shaft 70 externally of the housing within which the coupling is disposed. From this it will be understood that when the manually operated lever 82 is rocked from one position to another the slidable sleeve 68 will be correspondingly moved. This will cause the rack gear 74 carried thereby to rotate the pinions 81 and thus cause the tubular valve member 79 to turn within the stationary valve member 76 and thus progressively bring its ports 80 into register with the ports 77 and provide a discharge outlet for the conduit 75 which will progress inwardly within the limits of the vortex chamber as will be determined by the degree of rotation of the tubular valve member 79. In this manner as the ports 77 of the stationary valve member 76 are successively opened by rotation of the tubular valve member 79 there will be provided a discharge outlet the position of which will be determined by the particular port which is opened and through which the circulating fluid passing through the vortex chamber is centrifugally discharged. In other words, the particular port 77 of the valve member 76 which is opened in this manner will provide a weir-like overflow outlet outlet through which all fluid in excess of the level thus established in the vortex chamber may spill over or flow by centrifugal force. At this point it should be added that while the ports 77 and the perforations 80 are here shown as of relatively small diameter these may be greatly enlarged if a fine adjustment of the discharge flow is not required. While the valve member 76 and the tubular valve member 79 are shown as having two sets of ports and perforations it will also be understood that, if desired, only one series of such ports or perforations may be provided on these members. Like the previously described arrangement the end plates 58 and 59 of the housing carry an encircling shroud 82' which serves to confine the operating fluid and cause it to collect in a reservoir 83 at the lower part thereof. Within this reservoir 83 there is a strainer 84 through which the operating fluid is withdrawn by a pump 85 and then circulated to a cooler 86 from which it will be delivered by means of a pipe connection 87 to a chamber 89 that extends around the driven shaft 11 at the outer end of the cylindrical collar 66. In this manner the operating fluid designated by the numeral 90 may be caused to recirculate from the reservoir 83 and along the driven shaft 11 to the interior of the vortex chamber of the coupling.

By referring to Figure 6 of the drawings it will be noted that the two series of ports 77 which are arranged spirally upon the stationary valve member 76 are staggered vertically with respect to each other in each series so that with such an arrangement and the series of ports 80 of the tubular valve member 79 similarly staggered it will be seen that the discharge outlet through the conduit 27 may be varied in small increments. In other words, with this arrangement the level of fluid discharge, when operating fully through one of the open ports 77 will be transferred to a subsequent port 77 of the other series upon a slight additional rotation of the tubular valve member 79 and in this way a very fine adjustment of the fluid level within the vortex chamber will be possible.

As is more clearly shown in Figure 7 of the drawings the rack 74 is positioned slightly off center so that the pinion 81 will operate about a center that is radial to the axis of rotation of the coupling member. It is believed that with these further detailed showings the construction of this latter form of discharge conduit will be fully understood.

For a description of the two embodiments of the invention as described above, reference is now made to Figures 8, 9 and 10 of the drawings which diagrammatically illustrate the principals that are involved. In these diagrams there is shown a static representation of the lower half of the vortex chamber of a coupling. While the elements, as here shown, are static with the various levels of fluid indicated by a horizontal line it will be understood that in operation these levels will be comparable to the inner surface of the fluid which will be maintained by centrifugal force when the coupling is operating. In Figure 8 the fluid discharge conduit 26 with its swingable spout-like extension 27 is shown, for the purpose of the description, as swung outwardly in a plane at a right angle to that shown in Figure 1 of the drawings. When the extension 27 of the discharge conduit 26 is swung outwardly in this manner it will be seen that its outer open end will assume different levels with respect to the interior of the vortex chamber formed by the driving member 13 and the driven member 16. With the extension 27 radially disposed, as here shown, the level of fluid in the vortex chamber will completely cover the webs or fins 15 and 16 between which the fluid vortex operates to transmit energy. By the same token when the spout-like extension 27 is swung outwardly and away from the center line of rotation as indicated by the arrow, as here illustrated, it will be seen that the fluid within the vortex chamber will be held at varying levels depending upon the inclination of the discharge extension 27 of the conduit 26. When this extension 27 is swung outwardly to its extreme position the vortex chamber will be entirely emptied of all energy transmitting fluid and a complete disconnection will be established between the driving shaft 10 and the driven shaft 11. As indicated in this diagram the fluid which is discharged at the outlet of the swingable extension 27 of the conduit 26 will be collected in the reservoir 33 where after being picked up at the strainer 35 it will be pumped by the pump 38 to and through the fluid cooler 39 and then via the pipe 40 to the space between the collar 20 of the chamber forming portion 19 and the driven shaft 11 and then to the interior of the vortex chamber at a point near its axis of rotation. An advantage of this particular arrangement over the prior art methods of control is that it will permit the maintenance of any predetermined level of operating fluid within the vortex chamber irrespective of the rate of flow of the operating fluid therethrough. With this it will be seen that the operating fluid may be circulated, cooled and recirculated through the vortex chamber with a continuous and constant rate of flow. At the same time should the flow of fluid be temporarily discontinued for any reason the coupling will still operate with the particular level of fluid within the vortex chamber for which the discharge conduit 26 is adjusted. For some uses it is also contemplated that where no excessive heating is encountered the coupling may be operated in this latter manner. In this particular showing the swingable discharge spout 27 is shown as in a position to maintain a level of fluid within the vortex chamber which will correspond to the level here indicated by the line A—A.

Upon now referring to Figure 9 it will be seen that the principles of operation of the embodiment of the invention illustrated in Figure 4 of the drawings is substantially similar to those prevailing in the embodiment illustrated in Figure 1 of the drawings. However, in this instance instead of the swingable discharge spout 27 I have here provided the fixed and radially disposed discharge outlet 76 with its plurality of spirally arranged ports 77 with which the apertures or perforations 80 of the internally disposed valve member 79 are adapted to register as the latter member is turned relative thereto. As indicated in this diagram, one of the intermediate ports 77 of the conduit 76 is shown as in register with an intermediate perforation of the tubular valve member 79 and when so positioned these members will serve to permit the escape of fluid from the vortex chamber at a level corresponding to the line B—B. In this way there will be provided a range of control for the level of fluid in the vortex chamber which will correspond substantially to the radial length of the fluid discharge conduit 76. When operating in this manner it will be seen that as the operating fluid is discharged through one or the other of the ports 77 of the discharge conduit 76 it will return to the reservoir 83 where it will be picked up by the pump 85 and delivered to the cooler 86 from which the fluid will then return via the pipe connection 87 to the interior of the vortex chamber at a point near the axis of rotation of the coupling.

In Figure 10 there is shown a diagrammatic illustration of one form of prior art coupling having a driving member 91 and a driven member 92 which form a vortex chamber 93. In this arrangement the vortex chamber is provided with a restricted outlet 94 for the continuous discharge of the operating fluid at the perimeter of the coupling. In principle the operation of this type of coupling contemplates a pumping of the operating fluid to the vortex chamber at a rate which will compensate for the discharge of fluid which is constantly taking place at the restricted outlet 94. In this particular showing the rate of flow is illustrated as sufficient to maintain a level of fluid in the vortex chamber which will correspond to the line C—C. With this form of coupling, if it should be desired to lower the centrifugal level of the fluid in the vortex chamber of coupling the rate of flow will be decreased until the desired level is obtained or contrariwise if the level of fluid in the vortex chamber 93 is to be raised the rate of flow of fluid to the coupling will be increased to a point in excess of the rate of discharge of fluid through the outlet 94 until the new level is obtained. In this way the operation of the coupling and consequently the slip between the driving member 91 and the driven member 92 may be regulated. The upstanding column, designated by the numeral 95, is added to represent a column of fluid which would be comparable to the pressure obtained in a feed pipe 96 which delivers fluid from a cooler 97. With this particular arrangement it will be seen that the maintenance of any particular level of operating fluid within the vortex chamber will be dependent upon a regulation of the fluid pressure producing means such as a pump 98 which will withdraw the operating fluid from a reservoir 99 into which it is discharged from the restricted outlet 94. With this latter or prior art form of coupling it will be seen that the rate of flow of the operating fluid through the vortex chamber will be restricted and determined by the size of the discharge outlet means 94 and therefore the circulation of an operating fluid for the purpose of maintaining a cooled condition of operation will be correspondingly restricted. But, as distinguished from this it will also be seen that with the arrangements contemplated by this invention, as illustrated in Figures 8 and 9 of the drawings, a constant quantity and a uniform flow of operating fluid may be maintained within the vortex chamber of the coupling and this at any desired level. The size of the discharge outlets provided by my particular level controlling means may be of any desired size and therefore the rate of flow of operating fluid through the vortex chamber may be maintained at any rate which will insure a uniform and practical temperature for the operating fluid with any degree of slip between driving and driven members.

While I have, for the sake of clearness and in order to disclose the invention so that the same can be readily understood, described and illustrated specific devices and arrangements, I desire to have it understood that this invention is not limited to the specific means disclosed, but may be embodied in other forms that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A hydraulic coupling, including a driving member and a driven member, said members comprising primary and secondary elements and being arranged in juxtaposed relation to form a vortex supporting chamber therebetween for the circulation of a kinetic energy transmitting fluid, fluid supply means for introducing a continuous flow of kinetic energy transmitting fluid into said vortex supporting chamber, a fluid discharge conduit hinged upon and rotatable with one of said members forming an open ended inwardly extending fluid discharge outlet externally of said vortex chamber through which fluid will be centrifugally discharged from the outer perimeter of said vortex supporting chamber when the coupling is in operation, and means for swinging said fluid discharge conduit about its hinged connection upon said member to thus vary the position of its discharged outlet within the radial limits of said vortex chamber and with respect to the axis of rotation of the coupling to thus control and maintain any desired operating level of fluid in said vortex supporting chamber.

2. In a fluid coupling of the character described employing juxtaposed rotary members that form a vortex chamber for an energy transmitting fluid, the combination of a driving member, a driven member, means rotatable with one of said members forming a fluid confining chamber within which the other of said members operates, a fluid delivery conduit through which an energy transmitting fluid may be introduced into the vortex chamber formed by said driving and driven members, a fluid circulating means for delivering a constant flow of fluid to said delivery conduit, an externally disposed fluid discharge conduit hingedly mounted upon and rotatable with said fluid confining chamber and extending inwardly from the perimeter of said fluid confining chamber having an outlet end through which the fluid introduced into the vortex chamber by said circulating means will overflow and be centrifugally discharged from said chamber, and means for adjusting the position of the outlet end of said fluid discharge conduit relative to the axis about which said driving and driven members operate to thus vary the level of the circulating fluid that will be centrifugally maintained within the vortex chamber formed by said driving and driven members when the coupling is in operation.

3. A hydraulic coupling including a driving and a driven member arranged in juxtaposed relation and forming a vortex supporting chamber for the circulation of an energy transmitting fluid, means for introducing a continuous flow of fluid into said vortex supporting chamber, an adjustable fluid discharge conduit pivoted to swing in a plane transverse to the axis of the coupling and mounted upon and rotatable with said driving member having its discharge end disposed externally of said vortex supporting chamber and extending inwardly to provide a fluid outlet in radially variable relationship with respect to the axis of the coupling, and means for imparting a pivotal movement to said fluid discharge conduit by which the radial location of the outlet end thereof may be varied with respect to the axis of rotation of said members while the coupling is in operation.

4. In a hydraulic coupling of the kinetic energy type, the combination of primary and secondary coupling members arranged in juxtaposed relation and forming an operating fluid vortex chamber, fluid supply means for introducing an operating fluid into said vortex chamber when the coupling is in operation, a spout-like fluid discharging conduit mounted upon and rotatable with one of said juxtaposed members forming an adjustable fluid discharge conduit externally of said vortex chamber, said spout-like fluid discharge conduit being pivotally mounted upon said member at the outer perimeter of the vortex chamber to swing inwardly in a plane transverse to the axis of the coupling and toward the axis about which said coupling members operate and permit a continuous discharge of said fluid from said vortex chamber while the coupling is in operation, and means by which the free end of said fluid discharge conduit may be adjusted within the radial limits of the vortex chamber to maintain a sufficient quantity of operating fluid within said vortex chamber to transmit a corresponding amount of energy.

CARL A. ODING.

References Cited in the file of this patent

UNITED STATES PATENTS

| Number | Name | Date |
|---|---|---|
| 1,937,364 | Sinclair | Nov. 28, 1933 |
| 2,187,656 | Kiep et al. | Jan. 16, 1940 |
| 2,187,667 | Sinclair et al. | Jan. 16, 1940 |
| 2,264,341 | Sinclair et al. | Dec. 2, 1941 |
| 2,297,196 | Berger | Sept. 29, 1942 |
| 2,380,595 | Hertrich | July 31, 1945 |
| 2,557,894 | Siesel | June 19, 1951 |